Jan. 8, 1963  J. J. HESS, JR  3,071,964
AIR SPEED SENSOR

Filed Feb. 13, 1961

INVENTOR.
JOHN J. HESS JR., DEC'D
BY FRANKLIN NATIONAL BANK OF
LONG ISLAND, EXECUTOR

BY

ATTORNEY

Jan. 8, 1963   J. J. HESS, JR   3,071,964
AIR SPEED SENSOR
Filed Feb. 13, 1961   2 Sheets-Sheet 2
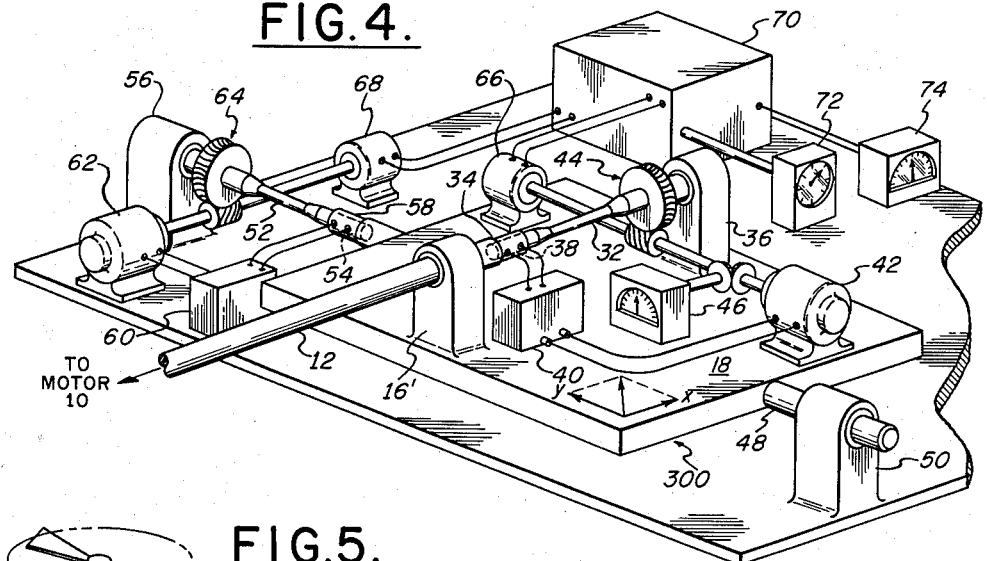
FIG.4.
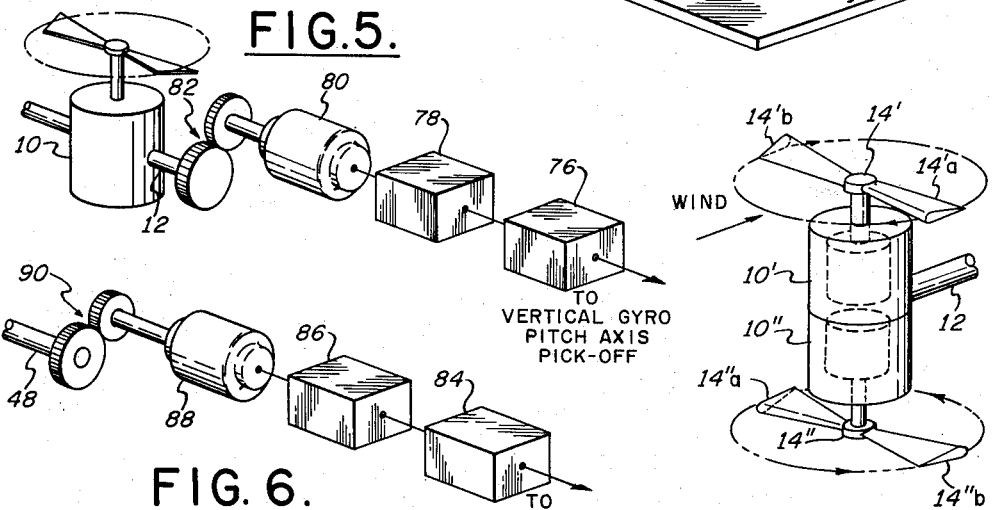
FIG.5.
FIG.6.
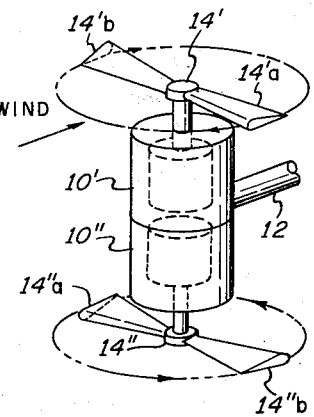
FIG.7.
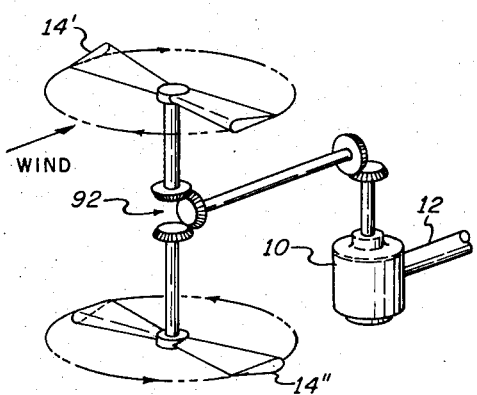
FIG.9.
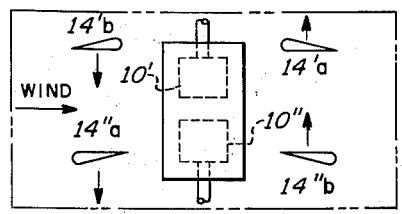
FIG.8.
INVENTOR.
JOHN J. HESS JR., DEC'D
BY FRANKLIN NATIONAL BANK OF
LONG ISLAND, EXECUTOR
BY
ATTORNEY United States Patent Office 3,071,964
Patented Jan. 8, 1963

3,071,964
AIR SPEED SENSOR
John J. Hess, Jr., deceased, late of Garden City, N.Y., by Joan T. Hess, executrix, Garden City, N.Y., and The Franklin National Bank of Long Island, executor; assignors to Sperry Rand Corporation, Great Neck, N.Y., a corporation of Delaware
Filed Feb. 13, 1961, Ser. No. 89,066
12 Claims. (Cl. 73—189)

This invention relates generally to apparatus for measuring fluid flow rates and more particularly to air speed measuring equipment for vehicles capable of hovering and/or moving at low speeds.

Conventional air speed measuring devices employing Pitot-static tubes respond to and convert air impact pressures to representative measures of air speed, the impact pressures being proportional to the squares of respective air speeds. So long as air speed is high, impact pressure is large and converted easily to a representative measure of air speed; however, at low air speeds, impact pressures are almost negligible, thereby making them virtually impossible to use in measuring air speed.

Apparatus embodying the present invention determines air speed, not from impact pressure, but from aerodynamic forces on the advancing and retreating blades of a simple motor driven fan rotating in a plane parallel to the relative wind. Generally, the motor that drives the fan is secured rigidly to a rotatable shaft which is also aligned parallel to the relative wind. In a simple embodiment of the invention, the shaft secured to the motor is rotatable against the tension of a spring. With a wind blowing across the face of the fan, the lift produced by the blade advancing into the wind is greater than the lift produced by the retreating blade, the advancing blade lift being proportional to the sum of the blade speed and the wind speed and the retreating blade lift being proportional to the difference between the blade and wind speeds. This difference in lift exerts a moment about the axis of the shaft rigidly secured to the motor and causes that shaft, together with the motor and fan assembly, to rotate against the tension of the spring in proportion to the speed of the relative wind. An indicator, calibrated in units of air speed, is therefore provided to measure the amount that the shaft rotates.

Because the shaft secured to the motor is rotated in response to simultaneously increasing and decreasing fan blade lifts, variations in the speed of the motor and/or the air density have little effect on the accuracy of the device since they either simultaneously increase or simultaneously decrease both lifts. For example, an increase in motor speed causes the lifts of the advancing and retreating blades to increase equally, thereby exerting no new moment about the axes of the shaft secured to the motor and fan assembly. Slight changes in air speed, however, are readily sensed since they cause changes in the lifts of the advancing and retreating blades which always cooperate to rotate the shaft in the same direction.

A principal object of the invention is to provide air speed measuring apparatus which has high sensitivity and accuracy.

Another object is to provide apparatus for accurately measuring the speed and direction of a relative wind.

The invention will be described with reference to the figures wherein.

FIG. 4 is a perspective view of apparatus capable of measuring the speed and direction of a relative wind, FIG. 5 is a schematic diagram of apparatus useable to improve the operation of the apparatus of FIGS. 1, 2 and 3, FIG. 6 is a schematic diagram of apparatus useable in conjunction with the apparatus of FIG. 5 to improve the operation of the embodiment shown in FIG. 4, FIG. 7 is a perspective view of a motor and fan assembly useable with the apparatus shown in FIGS. 1–4, FIG. 8 is a diagram useful in explaining the operation of the apparatus of FIG. 7, and FIG. 9 is a perspective view of a presently preferred motor and fan assembly.

Figure 1:
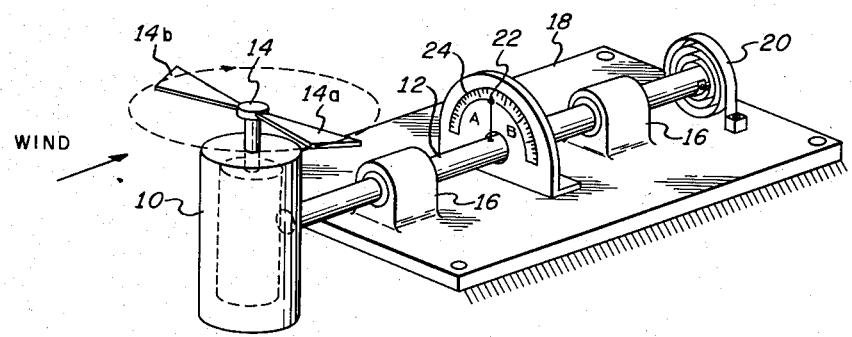
FIG. 1 is a perspective view of an embodiment of the invention.

Referring to FIG. 1, a motor 10, rigidly secured to a rotatable shaft 12, drives a simple fan 14 at a substantially constant high speed. The shaft 12 is rotatable in bearings 16 on a support 18 against the tension of a coil spring 20, the ends of which are secured respectively to the support 18 and the shaft 12. A pointer 22 secured to the shaft 12 cooperates with a two-section scale 24, each section of which is graduated in units of air speed. In measuring the speed of a relative wind, the support 18 is so positioned that the axis of the shaft 12 is aligned parallel to the direction of the wind, thereby keeping the fan plane of rotation always parallel to the direction that the wind is blowing. With the wind blowing across the face of the fan as shown in FIG. 1, the lift of the blade 14a advancing into the wind is increased, whereas the lift of the blade 14b moving with the wind is decreased. This imbalance in lift causes the motor and fan assembly and the shaft 12 to rotate against the tension of the spring 20 about the axis of the shaft 12 in proportion to the wind speed. The wind speed, therefore, may be read from one section (section A) of the scale 24. In the event there is a reversal in the direction of the relative wind, e.g. when the device is employed to measure the air speed of a helicopter and the helicopter goes backwards, the shaft will reverse its direction of rotation, thereby causing the pointer 22 to indicate the air speed on the other section (section B) of the scale 24.

Figure 2:
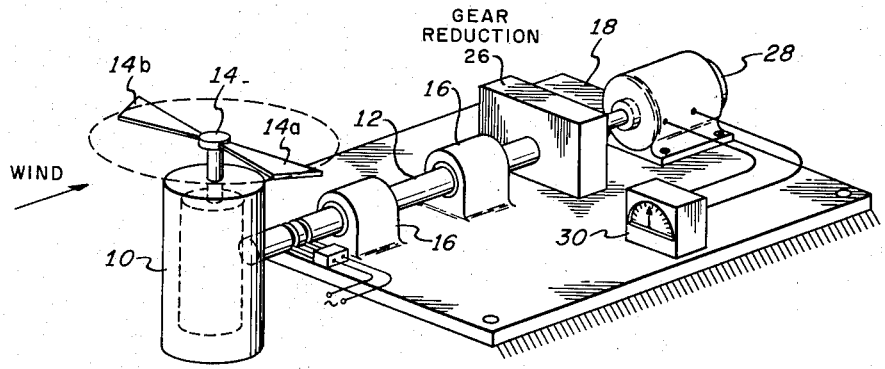
FIG. 2 is a perspective view of another embodiment of the invention.

Referring to FIG. 2, a different embodiment of the invention allows the motor and fan assembly and the shaft 12 to rotate freely, the spring 20 being removed from the device. Connected to the shaft 12, instead, is a gear reduction device 26, the output shaft of which drives the armature of a tachometer generator 28. A voltmeter 30, calibrated in units of air speed, receives the electrical output signal from the generator 28. Since the rotational movement of the motor and fan assembly is not restrained, slip rings, or the like, must be provided (preferably on the shaft 12) to deliver power to the motor 10. With the shaft 12 aligned parallel to the direction of the wind, a moment which is proportional to the wind speed is exerted, as heretofore described, about the axis of the shaft 12, thereby causing the shaft 12 to rotate. Since there is no restraining spring, the motor and fan assembly and the shaft 12 will rotate as long as a moment exists, i.e. as long as there is a relative wind, with the speed of rotation being proportional to the wind speed. The tachometer generator then converts the shaft rotational speed to a representative electrical signal which drives the meter 30 to indicate the speed of the wind. Reversal in the wind direction, as before, will cause the shaft 12 to rotate in the opposite direction, thereby causing the sense of the generator 28 output signal, and the direction that the meter 30 pointer deflects, to reverse.

Figure 3:
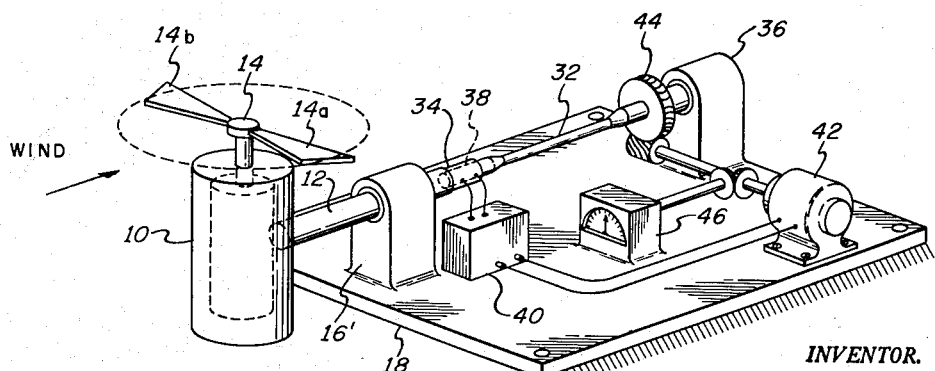
FIG. 3 is a perspective view of still another embodiment of the invention.

Referring to FIG. 3, the motor and fan assembly and the shaft 12 are neither rotatable within a limited range (as in FIG. 1), nor free to rotate (as in FIG. 2), but are restrained from rotating to any extent. As shown, the motor and fan assembly is secured to the shaft 12, the shaft being supported in a bearing 16' on the support member 18. A torsion bar 32 has one of its ends rigidly secured to the shaft 12 at 34 and has its other end rotatably supported in a bearing 36. A pick-off 38, e.g. a rotary E pick-off, operates to produce an electrical signal representing the amount that the torsion bar 32 is twisted. The pick-off 38 applies its output signal to an amplifier 40 which, in turn, applies its output signal to a motor 42. The motor 42 then rotates the bar 32, through gearing 44, in proportion to its input signal. An indicator 46, calibrated in units of air speed, is mechanically connected to and driven by the motor 42. In the presence of a wind, the motor and fan assembly and the shaft 12 start to rotate, thereby twisting the torsion bar 32. However, as soon as the bar starts to twist, an electrical signal is generated by the pick-off 38 which causes the motor 42 to rotate the bar and cancel the signal. The amount that the motor 42 must rotate the bar 32 to cancel the pick-off 38 output signal is proportional to the wind speed and is measured by the indicator 46. The apparatus of FIG. 3 has the advantage of having its fan always rotate in the same plane, thereby obviating any errors which might arise as a result of the motor and fan assembly center of gravity being shifted. In addition, the concepts embodied in the apparatus of FIG. 3 allow the invention to be used in measuring the magnitude and direction of a relative wind as will be explained later.

Referring to FIG. 4, wind speed measuring apparatus 300, identical to that shown in FIG. 3, is secured to a shaft 48 rotatably supported as shown in a bearing 50. For clarity, the support 18 is stripped of all but those elements necessary to a complete understanding of the device of FIG. 4. A torsion bar 52, similar to the torsion bar 32, has one of its ends rigidly secured to the device 300 at 54 and has its other end rotatably supported in a bearing 56. A pick-off 58, similar to the pick-off 38, produces a signal proportional to the amount that the bar 52 is twisted and applies that signal to an amplifier 60. The amplifier 60 applies its output signal to a motor 62 which rotates, through gearing 64, the bar 52 to cancel the signal produced by the pick-off 58. Rotatable transformers 66 and 68 are driven respectively by the motors 42 and 62 to produce signals representing the amounts that the two torsion bars are rotated. A resolving device 70, e.g. the device shown and described in "Components Handbook," Massachusetts Institute of Technology Radiation Laboratory Series, vol. 17, page 342, receives and vectorially adds the output signals from the transformers 66 and 68. Indicators 72 and 74 are connected to receive the output signals from the resolving device 70 and respectively display the direction and magnitude of the relative wind. With the wind blowing as shown in FIG. 4, the wind component X causes the motor 42 to drive an amount proportional to the magnitude of that component, with the transformer 66 operating to convert the amount that the motor 42 is driven to a representative electrical signal. Likewise, the wind component Y causes the bar 52 to twist, thereby producing a pick-off 58 output signal which drives the motor 62. The motor 62 then rotates the bar 52 to cancel the pick-off 58 output signal and causes the transformer 68 to produce a signal representing the amount that the motor 62 is driven. The transformer 28 output signal and the transformer 66 output signal are applied to the resolving device 70 which, as described in the aforementioned publication, vectorially adds those signals to indicate wind speed and direction. With the apparatus of FIG. 4, the fan 14 always rotates in a plane parallel to the relative wind, regardless of the direction that the wind is blowing. This is essential for accurate measurement of wind speed and direction since any tipping of the fan plane of rotation decreases the accuracy of the device. For example, rotation of the shaft 48 tips the fan plane of rotation so that the wind component X moves at, and not across, the face of the fan.

The fan 14, since it has a high rotational speed, is subject to gyroscopic rigidity and precession. Therefore, when the apparatus of FIGS. 1, 2 or 3 is employed within an aircraft and supported so that the shaft 12 is aligned generally parallel to the craft longitudinal axis, pitching motion of the craft will cause the fan to precess, thereby rotating the shaft 12 and giving a false air speed indication. To overcome this undesirable reaction to pitching motions, the apparatus of FIG. 5 is provided. In FIG. 5, a differentiating device 76, adapted to receive a signal representing the pitch attitude of the craft from a vertical gyro, applies its output signal to an amplifier 78 which, in turn, applies its output signal to a motor 80. The motor 80 then connects to and drives the shaft 12 through gearing 82. With the craft flying at a fixed pitch attitude, the motor and fan assembly and the shaft 12 rotate as described above with the motor 80 armature also being rotated in proportion to the air speed of the craft. As soon, however, as the craft starts to pitch up or down, precession of the fan starts to occur and to cause the device to indicate an incorrect air speed. However, at this time, the differentiating device 76 produces a signal representing the direction, i.e. whether a pitch up or pitch down, and the rate at which the craft pitch attitude is changing. This signal is applied to the motor 80 and causes the motor to drive the shaft 12 to cancel the air speed error being developed.

The apparatus of FIG. 4, since it is subject to precession forces about two axes, i.e. axes parallel to the pitch and roll axes, requires the apparatus of FIG. 6 in addition to the apparatus of FIG. 5. The apparatus of FIG. 6 is identical to, and functions exactly the same as, the apparatus of FIG. 5, and includes a differentiator 84, an amplifier 86, and a motor 88 which rotates the shaft 48 by means of gearing 90. The input signal to the differentiator 84, however, represents the roll attitude of the craft.

The tendency of the shaft 12 to be rotated by gyroscopic precession of the fan 14 may be eliminated also by the appaartus of FIG. 7 which operates to provide two precessional forces that cancel each other. In FIG. 7, a motor 10', driving a fan 14', is secured back-to-back to a motor 10" which drives a fan 14". The two fans rotate in parallel planes at exactly the same speed, but in counter directions, and are so positioned on the shafts of the motors 10' and 10" that the fan blades are aligned in the same direction whenever they are parallel to the shaft 12. In addition, the fans 14' and 14" are inverted so that when they are parallel to the wind, their respective blades move relative to the wind as shown in FIG. 8, with the blades 14'a and 14"a moving into the wind and the blades 14'b and 14"b moving with the wind. Therefore, the lifts (as represented by small arrows on FIG. 8) provided by both fans 14' and 14" always cooperate to rotate the shaft 12 in the same direction.

The apparatus of FIG. 7 requires that the fans 14' and 14" be positioned on the shafts of the motors 10' and 10" as described above, and that the motors 10' and 10" run at exactly the same speed. Otherwise, the fans will not cooperate completely to rotate the shaft 12 in the same direction, thereby decreasing the sensitivity of the device. To overcome the stringent requirement that two motors rotate always at the same speed, the apparatus of FIG. 9 is provided and utilizes a single motor to drive, through gearing 92, the fans 14' and 14" in opposite directions.

The invention, as described, has employed two-blade fans to measure wind speed. Obviously, though, multi-blade fans may be employed also, with the above-mention moment being proportional to the difference between the instantaneous sum of all lifts produced by the blades moving against the wind and the instantaneous sum of all lifts produced by blades moving with the wind. In addition, the invention need not be restricted to air speed measurements, but may be employed to measure any fluid flow rate simply by immersing the fan in the fluid whose flow rate is to be measured.

While the invention has been described in its preferred embodiments, it is to be understood that the words which have been used are words of description rather than of limitation and that changes within the purview of the appended claims may be made without departing from the true scope and spirit of the invention in its broader aspects.

What is claimed is:

1. Apparatus for measuring the rate of flow of a fluid comprising a motor, a fan driven by said motor at a substantially constant high speed and adapted to be immersed in said fluid in such a way that its plane of rotation is always parallel to the direction that the fluid is flowing, indicating means calibrated in units of flow speed, and means responsive to the difference between the lifts produced by the advancing and retreating blades of said fan to drive said indicating means in proportion to said lift difference.

2. Apparatus for measuring the speed of a relative wind comprising a fan, means rotating said fan at a substantially constant high speed and supporting said fan in such a way that the fan plane of rotation is always parallel to the wind direction, indicating means, and means responsive to the difference between the aerodynamic lifts produced by the advancing and retreating fan blades to drive said indicating means.

3. Apparatus for measuring air speed comprising a fan, means connected to said fan for rotating said fan at a high speed in a plane parallel to the relative wind, indicating means, and means responsive to a moment tending to rotate the fan about an axis parallel to the direction of the wind to drive said indicating means, said moment being produced by the difference in the lifts of the advancing and retreating fan blades.

4. An aircraft air speed measuring device comprising a fan, a motor connected to rotate said fan, shaft support means secured to the motor and fan assembly in such a way that said shaft support means lies parallel to the direction of the relative wind and the fan plane of rotation, indicating means calibrated in units of air speed, and means responsive to moments about the axis of said shaft support means to drive said indicating means, said moments being produced by differences in the lifts produced by the advancing and retreating fan blades.

5. An aircraft air speed measuring device comprising a fan, a motor connected to rotate said fan, shaft support means rotatable about its own longitudinal axis secured to the motor and fan assembly in such a way that said shaft support means lies parallel to the direction of the relative wind and the fan plane of rotation, means restraining the rotatability of the shaft support means, indicating means calibrated in units of air speed responsive to measure the amount said shaft support means rotates, said shaft support means being rotated in proportion to the difference in the lifts of the fan blades moving against and with the relative wind.

6. An aircraft air speed measuring device comprising a fan, a motor connected to rotate said fan, shaft support means rotatable about its own longitudinal axis secured to the motor and fan assembly in such a way that said shaft support means lies parallel to the direction of the relative wind and the fan plane of rotation, and tachometer means calibrated in units of air speed driven by said shaft support means, said shaft support means rate of rotation being proportional to a moment produced by a difference in the advancing and retreating fan blade lifts.

7. Apparatus for measuring the speed and direction of a horizontal relative wind comprising a fan, means rotating said fan at a substantially constant high speed and supporting said fan in such a way that the plane of rotation of said fan is always horizontal, the blades of said fan being responsive to a first component of the wind to apply a moment to said fan about an axis parallel to that component and being responsive to a second wind component, orthogonal to said first wind component, to apply a moment to said fan about an axis parallel to said second wind component, means responsive to both said moments to produce signals respectively representing those moments, and means receiving both said signals and vectorially adding them.

8. Apparatus for measuring the speed and direction of a horizontal relative wind comprising a fan, means rotating said fan at a substantially constant high speed and supporting said fan in such a way that the plane of rotation of said fan is always horizontal, said motor and fan assembly having moments applied thereto which tend to rotate said assembly about a first horizontal axis in response to a first component of the relative wind and which tend to rotate said assembly about a second horizontal axis orthogonal to said first axis in response to a second wind component orthogonal to said first wind component, means responsive to said moments to produce representative signals, and resolving means receiving and vectorially adding said signals.

9. An aircraft air speed measuring device comprising a fan, a motor connected to rotate said fan, shaft support means secured to the motor and fan assembly in such a way that said shaft support means lies parallel to the direction of the relative wind and the fan plane of rotation, indicating means calibrated in units of air speed, means responsive to moments about the axis of said shaft support means to drive said indicating means, said moments being produced by differences between the lifts produced by advancing and retreating fan blades, and means responsive to pitching maneuvers to apply moments to said shaft support means to counter precessional moments produced when the fan is rotated about an axis parallel to the craft pitch axis.

10. Apparatus for measuring air speed comprising a fan assembly, said assembly comprising a pair of fans and means rotating said fans about the same axis in counter directions, but in planes parallel to the relative wind, one of said fans operating to blow air in one general direction and the other of said fans operating to blow air in the opposite direction, indicating means, and means responsive to a moment tending to rotate the fan assembly about an axis parallel to the direction of the wind to drive said indicating means, said moment being produced by the differences in the lifts of the advancing and retreating blades of each of said fans.

11. Apparatus for measuring the speed and direction of a relative wind comprising a fan assembly, said assembly comprising a pair of fans and means rotating said fans about the same vertical axis in counter directions, one of said fans blowing air in a generally upward direction and the other of said fans blowing air in a generally downward direction, the blades of each of said fans being responsive to a first component of the wind to apply a moment to said assembly about an axis parallel to that component and being responsive to a second wind component, orthogonal to said first wind component, to apply a moment to said assembly about an axis parallel to said second wind component, means responsive to both said moments to produce signals respectively representing those moments, and means receiving both said signals and vectorially adding them.

12. Apparatus for measuring air speed comprising a fan assembly, said assembly comprising a motor, a pair of fans, and gearing connecting each of said fans to said motor, said motor rotating said fans about the same axis in counter directions, but in planes parallel to the relative wind, one of said fans operating to blow air in one general direction and the other of said fans operating to blow air in the opposite direction, indicating means, and means responsive to a moment tending to rotate the fan assembly about an axis parallel to the direction of the wind to drive said indicating means, said moment being produced by the differences in the lifts produced by the advancing and retreating blades of each of said fans.

No references cited.